United States Patent
Dong et al.

(10) Patent No.: US 10,452,495 B2
(45) Date of Patent: Oct. 22, 2019

(54) TECHNIQUES FOR RELIABLE PRIMARY AND SECONDARY CONTAINERS

(71) Applicant: Intel Corporation, Santa Clara, CA (US)

(72) Inventors: Yao Zu Dong, Shanghai (CN); Yunhong Jiang, San Jose, CA (US); Kun Tian, Shanghai (CN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/576,075

(22) PCT Filed: Jun. 25, 2015

(86) PCT No.: PCT/CN2015/082345
§ 371 (c)(1),
(2) Date: Nov. 21, 2017

(87) PCT Pub. No.: WO2016/206047
PCT Pub. Date: Dec. 29, 2016

(65) Prior Publication Data
US 2018/0143885 A1    May 24, 2018

(51) Int. Cl.
*G06F 11/14*        (2006.01)
*H04L 1/08*         (2006.01)
*G06F 9/54*         (2006.01)
*G06F 11/16*        (2006.01)

(52) U.S. Cl.
CPC .......... *G06F 11/1471* (2013.01); *G06F 9/547* (2013.01); *G06F 11/1482* (2013.01); *H04L 1/08* (2013.01); *G06F 11/1641* (2013.01); *G06F 11/1687* (2013.01); *G06F 2201/805* (2013.01); *G06F 2201/82* (2013.01)

(58) Field of Classification Search
CPC .. G06F 11/1471; G06F 9/547; G06F 11/1482; G06F 11/1641; G06F 11/1687; G06F 2201/805; G06F 2201/82; H04L 1/08
See application file for complete search history.

(56) References Cited

U.S. PATENT DOCUMENTS

| 2004/0181471 A1* | 9/2004 | Rogers | ................. G06F 8/20 705/31 |
| 2006/0195816 A1* | 8/2006 | Grandcolas | ............ G06Q 40/02 717/101 |

(Continued)

OTHER PUBLICATIONS

International Search Report and Written Opinion received for PCT Patent Application No. PCT/CN2015/082345, dated Mar. 24, 2016, 13 pages.

(Continued)

*Primary Examiner* — Kyle Vallecillo

(57) ABSTRACT

It includes techniques to provide for reliable primary and secondary containers arranged to separately execute an application that receives request packets for processing by the application. The request packets may be received from a client coupled with a server arranged to host the primary container or the secondary container. The client coupled with the server through a network. Coarse-grained lock-stepping (COLO) methods may be utilized to facilitate in providing the reliable primary and secondary containers.

25 Claims, 12 Drawing Sheets

(56) References Cited

U.S. PATENT DOCUMENTS

| | | |
|---|---|---|
| 2009/0089781 A1 | 4/2009 | Shingai et al. |
| 2009/0300414 A1 | 12/2009 | Huang et al. |
| 2010/0023995 A1* | 1/2010 | Kim .................. G06F 21/57 726/1 |
| 2011/0093838 A1* | 4/2011 | Archambault .......... G06F 8/443 717/158 |
| 2011/0153909 A1 | 6/2011 | Dong |
| 2013/0167146 A1 | 6/2013 | Dong et al. |
| 2017/0324609 A1* | 11/2017 | Hong ................ G06F 11/1435 |

OTHER PUBLICATIONS

Dunlap et al., "Execution replay of multiprocessor virtual machines", Proceedings of the fourth ACM SIGPLAN/SIGOPS international conference on Virtual execution environments, Mar. 5-7, 2008, 10 pages.

Cully et al., "Remus: High Availability via Asynchronous Virtual Machine Replication", NSDI '08: 5th Usenix Symposium on Networked Systems Design and Implementation, 2008, 14 pages.

Hines, Michael R., "Features/Micro Checkpointing", WIKI, <https://wiki.qemu.org/Features/MicroCheckpointing>, 2015.

Dong et al., "COLO: COarse-grained LOck-stepping virtual machines for non-stop service", Proceedings of the 4th annual Symposium on Cloud Computing, Oct. 2013, 16 pages.

"Paxos (Computer Science)", Wikipedia, retrieved from <https://en.wikipedia.org/wiki/Paxos_(computer_science)#Byzantine_Paxos>, 2006, 19 pages.

\* cited by examiner

Storage Medium 800

*Computer Executable Instructions for 700*

ESTABLISH, AT CLIENT ARRANGED TO HOST A FIRST APPLICATION, A SESSION CONNECTION BETWEEN A FIRST COLO AGENCY IMPLEMENTED WITHIN A FIRST SOCKET LIBRARY FOR USE BY THE FIRST ESTABLISH A SESSION CONNECTION BETWEEN A FIRST COLO AGENCY IMPLEMENTED WITHIN A FIRST SOCKET LIBRARY FOR USE BY THE FIRST APPLICATION AND A SECOND COLO AGENCY IMPLEMENTED WITHIN A SECOND SOCKET LIBRARY FOR USE BY A SECOND APPLICATION SEPARATELY EXECUTED BY A PCN OR AN SCN, THE PCN OR SCN HOSTED BY A SERVER COUPLED WITH THE CLIENT THROUGH A NETWORK
*1002*

CAUSE REQUEST PACKETS TO BE SENT VIA THE SESSION CONNECTION, THE REQUEST PACKETS DESTINED FOR PROCESSING BY THE SECOND APPLICATION SEPARATELY EXECUTED BY THE PCN OR SCN
*1004*

FORWARD TO THE FIRST APPLICATION RECEIVED OUTPUTTED RESPONSE PACKETS ORIGINATING FROM THE SECOND APPLICATION EXECUTED BY THE PCN FOLLOWING COMPLETION OF A CHECK POINT ACTION BY A COLO MANAGER AT THE SERVER HOSTING THE PCN OR THE SCN, THE CHECKPOINT ACTION TO SYNCHRONIZE AN OPERATIONAL STATE OF THE PCN WITH AN OPERATIONAL STATE OF THE SCN
*1006*

*FIG. 10*

Storage Medium *1100*

Computer Executable Instructions for 1000

*FIG. 11*

TECHNIQUES FOR RELIABLE PRIMARY AND SECONDARY CONTAINERS

CROSS-REFERENCE TO RELATED APPLICATIONS

This application is a national phase claiming the benefit of and priority to International Patent Application No. PCT/CN2015/082345, entitled "TECHNIQUES FOR RELIABLE PRIMARY AND SECONDARY CONTAINERS", filed Jun. 25, 2015, which is hereby incorporated by reference in its entirety.

TECHNICAL FIELD

Examples described herein are generally related to routing data generated by or originating from an application separately executed by a primary container (PCN) and a secondary container (SCN) between a server/servers hosting the PCN or SCN and a client.

BACKGROUND

Network servers coupled with client computing devices are increasingly being arranged to support or host containers that enable a single operating system to support multiple isolated systems ("containers") on a single hosting server or hosting computing platform. These may be arranged to execute applications responsive to receiving requests from one or more clients. Also, when high availability is desired for applications executed by containers hosted by servers, a primary container (PCN) and a secondary container (SCN) may each be hosted on separate servers or nodes (e.g., within a data center) and their operational states may be replicated. This replication of operational states may provide for an application-agnostic, software-implemented hardware fault tolerance solution for "non-stop-service". The fault tolerance solution may allow for the SCN to take over (failover) when the server hosting the PCN suffers a hardware failure and/or the PCN enters a fail state.

Lock-stepping is a fault tolerance solution that may replicate PCN/SCN operational states per instruction. For example, PCN and SCN may execute an application in parallel for deterministic instructions, but lock-step for non-deterministic instructions. However, lock-stepping may suffer from very large overhead when dealing with multiprocessor (MP) implementations, where each memory access might be non-deterministic.

Checkpointing is another fault tolerance solution that replicates a PCN operational state to an operational state of the SCN at periodic epochs. For checkpointing, in order to guarantee a successful failover, all output packets may need to be buffered until a successful checkpoint action has been completed. Buffering until a successful checkpoint action is complete in a container environment may lead to extra network latency and overhead due to output packet buffering and frequent checkpoint actions.

COarse-grain LOck-stepping (COLO) is yet another fault tolerance solution that has both PCN and SCN being fed with a same request/data (input) network packets from a client. Logic and/or features supporting COLO may be capable of monitoring output responses of the PCN and SCN and consider the SCN's operational state as a valid replica of the PCN's operational state as long as network responses (output) generated by the SCN match that of the PCN. If a given network response does not match, transmission of the network response to the client is withheld until the PCN operational state has been synchronized (force a new checkpoint action) to the SCN operational state. Hence, this type of COLO procedure may ensure that a fault tolerant system is highly available via failover to the SCN. This high availability may exist even though non-determinism may mean that the SCN's internal operational state may be momentarily different to that of the PCN's operational state. The SCN's operational state may appear equally valid and remains consistent from the point of view of external observers to the fault tolerant system that implements a COLO procedure. Thus, COLO procedures may have advantages over pure lock-stepping or checkpointing fault tolerance solutions.

COLO fault tolerance solutions may take advantage of such protocols as those associated with the transport control protocol (TCP) stack. The TCP stack may be arranged to have an operational state per-TCP connection between applications at a server and a client and may be capable of recovering from packet loss and/or packet re-ordering. However, unlike virtual machine implementations, outputted response packets for PCNs and SCNs may not need to rely on comparison of outputted response packets that may be processed through a TCP stack.

BRIEF DESCRIPTION OF THE DRAWINGS

FIG. 8 illustrates an example of a first storage medium.
FIG. 10 illustrates an example of a second logic flow
FIG. 11 illustrates an example of a second storage medium.

DETAILED DESCRIPTION

Figure 1:
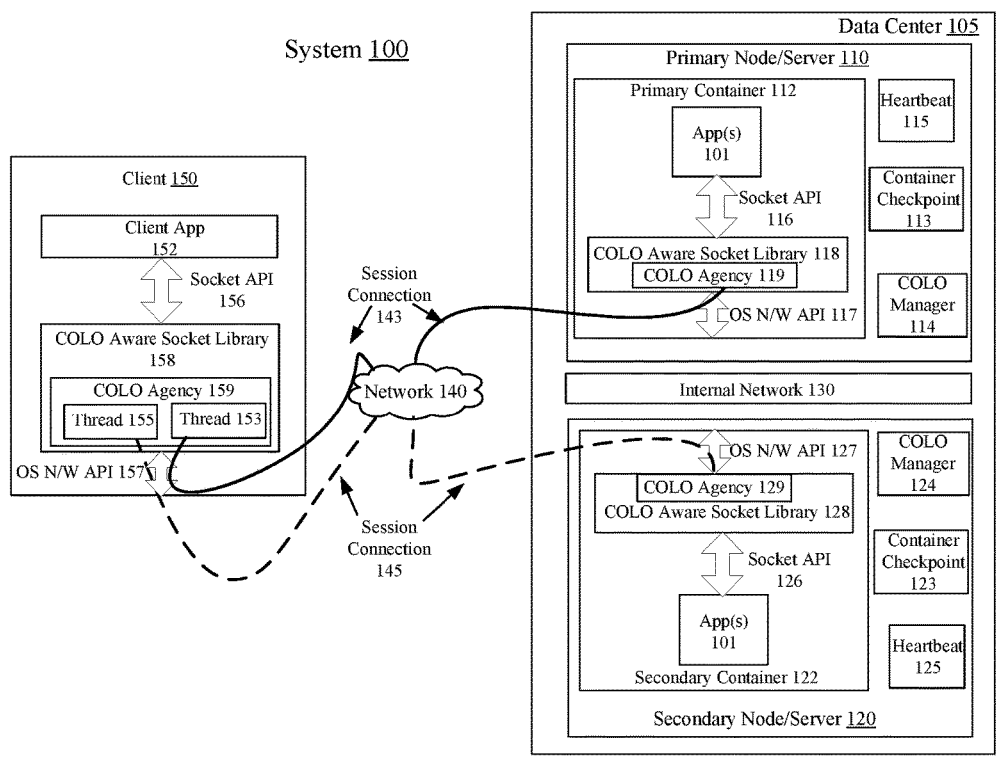
FIG. 1 illustrates an example system.

As contemplated in the present disclosure, a COLO procedure or solution may have advantages over pure lock-stepping or checkpointing fault tolerance solutions. COLO procedures may greatly improve performance of a highly available fault tolerant system via use of servers that host a PCN and an SCN. COLO procedures for PCNs and SCNs may include use of a per-session connection outputted response packet comparison. The per-session connection outputted response packet comparison may consider an SCN's operational state as a valid replica if outputted response packets of a session connection with the client originating from an application executed by the PCN match or are within a difference threshold for outputted response packets originating from the application also executed by the SCN. However, unlike virtual machine implementations that compare TCP/IP protocol-based packets, outputted response packets for PCNs and SCNs may not need to rely on comparison of outputted response packets that are TCP/IP protocol-based and a comparison can be made before being processed through a TCP stack. For examples, comparisons may be made at the session layer. It is with respect to these challenges that the examples described herein are needed.

According to some examples, techniques for reliable PCNs and SCNs may include implementing a first method at circuitry for a server arranged to host a PCN or SCN. The PCN and the SCN may be capable of separately executing a first application. The first method may include establishing a session connection between a first COLO agency implemented within a first socket library for use by the first application and a second COLO agency implemented within a second socket library for use by a second application executed at a client coupled with the server through a network. The first method may also include receiving request packets originating from the second application at the client and then initiating a checkpoint action responsive to receiving an indication that content of outputted response packets originating from the separately executed first application by the PCN and the SCN does not match. For these examples, the checkpoint action may include synchronizing an operational state of the PCN with an operational state of the SCN.

According to some examples, techniques for reliable PCNs and SCNs may include implementing a second method at circuitry for a client arranged to host a first application. The second method may include establishing a session connection between a first COLO agency implemented within a first socket library for use by the first application and a second COLO agency implemented within a second socket library for use by a second application separately executed by a PCN or a SCN. The PCN or SCN may be hosted by a server coupled with the client through a network. The second method may also include sending request packets via the session connection. The request packets may be destined for processing by the second application separately executed by the PCN or SCN. The second method may also include forwarding to the first application received outputted response packets originating from the second application executed by the PCN following completion of a checkpoint action by a COLO manager at the server hosting the PCN or the SCN. For these examples, the checkpoint action may synchronize an operational state of the PCN with an operational state of the SCN.

FIG. 1 illustrates an example system 100. In some examples, as shown in FIG. 1, system 100 includes a data center 105 having a primary node/server 110 that may be communicatively coupled with a secondary node/server 120 through an internal network 130 (e.g., via an internal network communication channel). In some examples, as described more below, logic and/or features hosted by primary node/server 110 or secondary node/server 120 may establish respective session connections 143 and 145 through a network such as network 140 with logic and/or features hosted by client 150.

According to some examples, primary node/server 110 and secondary node/server 120 may be arranged as part of a fault tolerance system for virtualized container environments. For these examples, primary node/server 110 may be arranged to host a primary container (PCN) 112 and secondary node/server 120 may be arranged to host a secondary container (SCN) 122. Both PCN 112 and SCN 122 may be capable of separately executing the same application(s) 101. Applications(s) 101, for example, may be arranged to process requests received from a client application 152 hosted by client 150.

In some examples, PCN 112 and SCN 122 may respectively include COLO aware socket libraries 118 and 128. For these examples, as shown in FIG. 1, COLO aware library 118 may be situated between socket application interface (API) 116 and operating system (OS) network (N/W) API 117 and COLO aware library 128 may be situated between socket API 126 and OS N/W API 127. According to these examples, COLO agency 119 may be implemented within COLO aware socket library 118 and may include logic and/or features to establish session connection 143 with COLO agency 159 implemented within a COLO aware socket library 158 at client 150 situated between OS N/W API 157 and socket API 156. Also, COLO agency 129 may be implemented within COLO aware socket library 128 and may include similar logic and/or features to establish session connection 145 with COLO agency 159. COLO agency 159 may establish and maintain session connection 143 with COLO agency 119 via thread 153 and may establish and maintain session connection 145 with COLO agency 129 via thread 155. Although single session connections are shown in FIG. 1 between COLO agency 119 and COLO agency 159 as well as between COLO agency 129 and COLO agency 159, examples are not limited to single session connections. Multiple session connections are contemplated and thus this disclosure is not limited to single session connection between a COLO agency at a client and a COLO agency at a PCN or an SCN hosted by a server.

According to some examples, COLO aware library 158, for example, may be for use by client application 152 for session packet forwarding for requests/response packets sent to or received from PCN 112 or SCN 122 via respective session connections 143 and 145. COLO aware libraries 118 and 128, for example, may be for use by applications(s) 101 for session packet forwarding for requests/response packets received from or sent to client app 152. For these examples, COLO aware may indicate that these libraries may work with a COLO protocol or process that may include logic and/or features at COLO agencies 159, 119 or 129 being capable of monitoring outputted response packets originating from application(s) 101 separately executed by PCN 112 and SCN 122 and determine whether or not the content of the outputted response packets match. As described more below, the logic and/or features at COLO agencies 119 or 129 may be capable of initiating a checkpoint action responsive to receiving an indication that the content does not match. The checkpoint action, for example, may synchronize the operational state of PCN 112 (e.g., container checkpoint 113) with the operational state of SCN 122 (e.g., container checkpoint 123). Once the operational states are synchronized, logic and/or features at COLO agency 159 may then cause response packets received from SCN 122 via session connection 145 to be dropped and then cause response packets received from PCN 112 to be forwarded to client application 152. If the content matches, no checkpoint action is needed and COLO agency 159 may then just drop the response packets received from SCN 122 and forward the response packets received from PCN 112.

In some examples, COLO agencies 119 and 129 may include logic and/or features to initiate a checkpoint action with respective COLO managers 114 and 124. For these examples, COLO manager 114 may coordinate the checkpoint action with COLO manager 124 via communications routed through internal network 130. This coordination may include exchanging information included in container checkpoints 113 and 123 to synchronize the operational state of PCN 112 with the operation state of SCN 122.

In some examples, primary node/server 110 and secondary node/server 120 may each maintain respective heartbeats 115 and 125 to communicate health status for the overall server (e.g., physical hardware). For example, heartbeat 115 may include health status information for primary node/server 110 to determine if primary node/server 110 has failed or become unresponsive and thus requiring SCN 122 to failover and become the PCN to serve or handle request packets received from client application 152. Similarly, heartbeat 125 may include health status information for secondary node/server 120 to determine if secondary node/server 120 has failed or become unresponsive and thus requiring another SCN to be configured for providing fault tolerance for PCN 112. COLO manager 114 may monitor heartbeat 125 to determine whether secondary node/server 120 has failed or is about to fail. Meanwhile, COLO manager 124 may monitor heartbeat 115 to determine whether primary node/server 110 has failed or is about to fail. If COLO manager 114 or 124 detects a failure from a monitored heartbeat they may send an indication to their respective COLO agency 119 or 129. The COLO agency receiving the indication of failure may then take actions to either failover to become the PCN or establish a different SCN.

Figure 2:
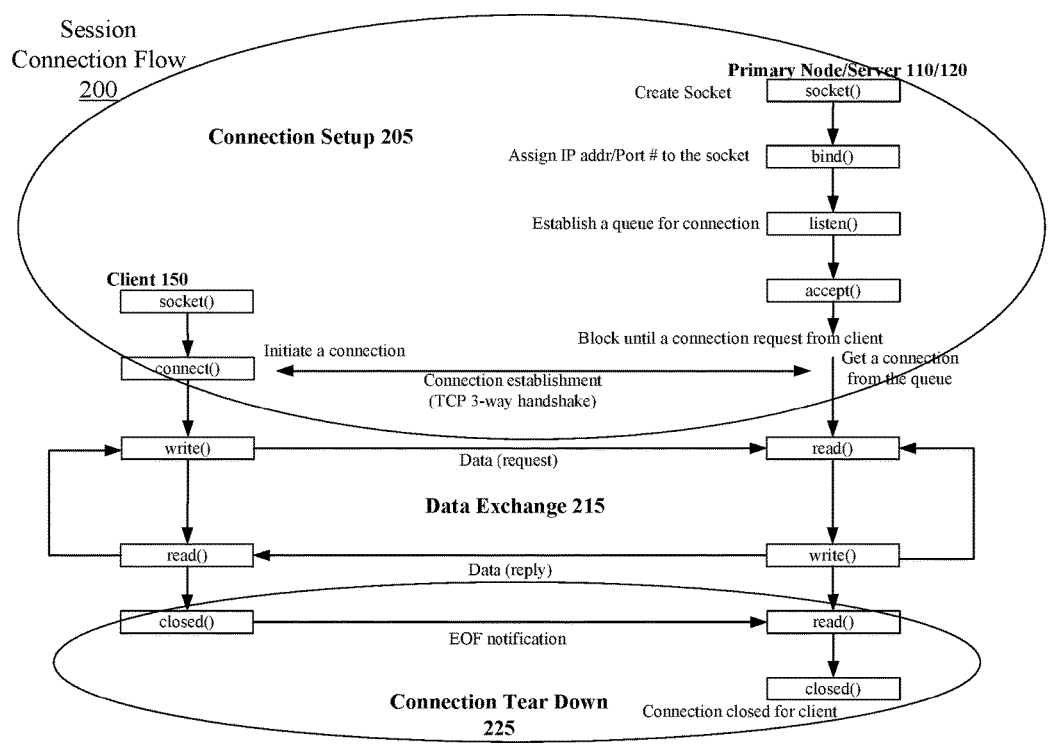
FIG. 2 illustrates an example session connection flow.

FIG. 2 illustrates an example session connection flow 200. In some examples, session connection flow 200 may be a paradigm of a TCP programming interface and may depict a flow of communication between client 150 and primary node/server 110 or secondary node/server 120. As shown in FIG. 2, session connection flow 200 may include various phases or stages for TCP programming to include a connection setup 205, a data exchange 215 and a connection teardown 225. For these examples, session connection flow 200 may be associated with a portable operating system interface (POSIX) socket API. Although some OSes may use other socket APIs. Thus, this disclosure is not limited to POSIX socket APIs for connection setup, data exchange or teardown.

According to some examples, at connection setup 205, a COLO manager at primary node/server 110 such as COLO manager 114 may communicate with a COLO manager at secondary node/server 120 such as COLO manager 124, and communicate with a COLO agency at client 150 such as COLO agency 159 to exchange initialization information. The exchanged initialization information may include, for example, an internet protocol (IP) address of primary node/server 110 and/or secondary node/server 120.

In some examples, client application 152 may setup session connection 143 with PCN 112 at primary node/server 110 through socket API calls. COLO agency 159 at client 150 or COLO agency 129 at secondary node/server 120 may then initiate session connection 145 through the same socket API calls. Connection 205 shows an example flow for connection setup 205. For these examples, session connection 145 may be setup at the same time as the session connection 143 or following successful setup of session connection 143 (e.g., at the accept( )/connect( ) portions of connection setup 205.

According to some examples, a similar process using socket API calls may be utilized for connection tear down 225 to tear down the session connections 143 and 145.

In some examples, as mentioned above and shown in FIG. 1, COLO agency 159 may maintain session connection 143 with COLO agency 119 via thread 153 and maintain session connection 145 with COLO agency 129 via thread 155. These separate threads 153 and 155 may respectively process sessions 143 and 145 independently. This may include each thread having logic and/or features to send or receive packets to/from their counterpart. As described more below, not all packets received by threads 153 and 155 may be forwarded to client application 152. In most instances, these packets may be dropped. For example, following a check-point action or if content of response packet outputted by PCN 112 or SCN 122 matches.

According to some examples, rather than having separate session connections between COLO agency 159 and COLO agencies 119 and 129, a single session connection may be established. This single session connection may be between COLO agency 159 and COLO agency 119 at PCN 112. For these examples, COLO agency 159 does not have a need for use of separate threads to process the single session connection. Also, in the event of a failover from PCN 112 to SCN 122, a new session connection between COLO agency 159 and COLO agency 129 would need to be established as part of the failover process.

Figure 3:
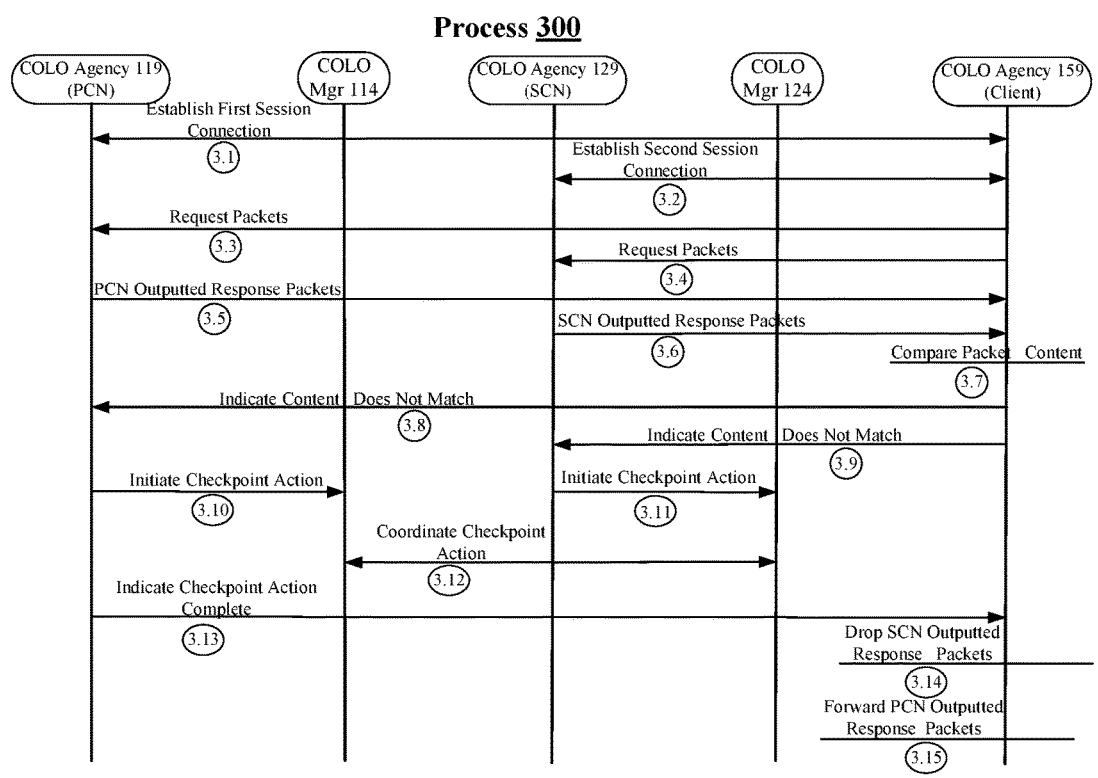
FIG. 3 illustrates an example first process.

FIG. 3 illustrates a first example process. In some examples, as shown in FIG. 3, the first example process includes process 300. Process 300 may be for maintaining reliable PCNs and SCNs at servers having separate session connections with a client. For these examples, elements of system 100 as shown in FIG. 1 such as COLO agencies 119, 129 and 159 and COLO managers 114 and 124 may be related to process 300. Also session connection flow 200 as shown in FIG. 2 may also be related to process 300. However, the example process 300 is not limited to implementations using elements of system 100 or session connection flow 200 shown in FIGS. 1-2.

Beginning at process 3.1 (Establish First Session Connection), logic and/or features of COLO agencies 119 and 159 may establish a first session connection. In some examples, the first session connection may by session connection 143. Session connection 143 may be maintained by thread 153 of COLO agency 159 to send request packets generated by or originating from client application 152 to application(s) 101 executed by PCN 112 and to receive outputted response packets generated by or originating from application(s) 101 executed by PCN 112.

Moving to process 3.2 (Establish Second Session Connection), logic and/or features of COLO agencies 129 and 159 may establish a second session connection. In some examples, the second session connection may by session connection 145. Session connection 145 may be maintained by thread 155 of COLO agency 159 to send request packets generated by or originating from client application 152 to application(s) 101 executed by SCN 122 and to receive outputted response packets generated by or originating from application(s) 101 executed by SCN 122.

Moving to process 3.3 (Request Packets), logic and/or features of COLO agency 119 may receive request packets sent from client 150 via session connection 143. In some examples, the request packets may have been generated by or originating from client application 152.

Moving to process 3.4 (Request Packets), logic and/or features of COLO agency 129 may receive request packets sent from client 150 via session connection 145. In some examples, as mentioned above, the request packets may have been generated by or originating from client application 152.

Moving to process 3.5 (PCN Outputted Response Packets), logic and/or features of COLO agency 119 may send outputted response packets generated by or originating from application(s) 101 executed by PCN 112 to COLO agency 159. In some examples, the PCN outputted response packets may be sent via session connection 143.

Moving to process 3.6 (SCN Outputted Response Packets), logic and/or features of COLO agency 129 may send outputted response packets generated by or originating from application(s) 101 executed by SCN 122 to COLO agency

159. In some examples, the SCN outputted response packets may be sent via session connection 145.

Moving to process 3.7 (Compare Packet Content), logic and/or features of COLO agency 159 may compare content of outputted response packets originating from the separately executed application(s) 101 by PCN 112 and SCN 122. In some examples, as part of a COLO procedure, the logic and/or features of COLO agency 159 may determine the content matches. If the content matches, the process may move to process 3.14. Otherwise, the process moves to process 3.8. In some examples, criteria on whether the content matches may include having identical content or may include a given difference threshold that may be set to allow for relatively minor differences in the content between the outputted response packets and yet have the operational states of PCN 112 and SCN 122 remain substantially synchronized when separately executing application(s) 101.

Moving to process 3.8 (Indicate Content Does Not Match), logic and/or features of COLO agency 159 may have determined that the content of the outputted response packets originating from the separately executed application(s) 101 by PCN 112 and SCN 122 does not match and may indicate this to COLO agency 119.

Moving to process 3.9 (Indicate Content Does Not Match), logic and/or features of COLO agency 159 may also send an indication to COLO agency 129 that the content of the outputted response packets originating from the separately executed application(s) 101 by PCN 112 and SCN 122 does not match.

Moving to process 3.10 (Initiate Checkpoint Action), logic and/or features of COLO agency 119 may initiate a checkpoint action with COLO manager 114 at primary node/server 110.

Moving to process 3.11 (Initiate Checkpoint Action), logic and/or features of COLO agency 129 may initiate a checkpoint action with COLO manager 124 at secondary node/server 120.

Moving to process 3.12 (Coordinate Checkpoint Action), COLO managers 114 at primary node/server 110 may coordinate a checkpoint action with COLO manager 124 at secondary node/server 120. In some examples, COLO manager 114 may use container checkpoint 113 to determine the current operational state of PCN 112 and provide information from container checkpoint 113 to enable COLO manager 124 to synchronize the operational state of SCN 122 with the operational state of PCN 112.

Moving to process 3.13 (Indicate Checkpoint Action Complete), logic and/or features at COLO agency 119 may indicate to COLO agency 159 that the checkpoint action is complete.

Moving to process 3.14 (Drop SCN Outputted Response Packets), logic and/or features at COLO agency 159 may drop outputted response packets originating from application(s) 101 executed by SCN 122. In some examples, the outputted response packets may be dropped following receipt of the indication that the checkpoint action was completed. In other examples, as mentioned above for process 3.7. If the content matched, the SCN outputted response packets may be dropped following this determination.

Moving to process 3.15 (Forward PCN Outputted Response Packets), logic and/or features at COLO agency 159 may forward the outputted response packets originating from application(s) 101 executed by PCN 112. The process may then come to an end.

Figure 4:
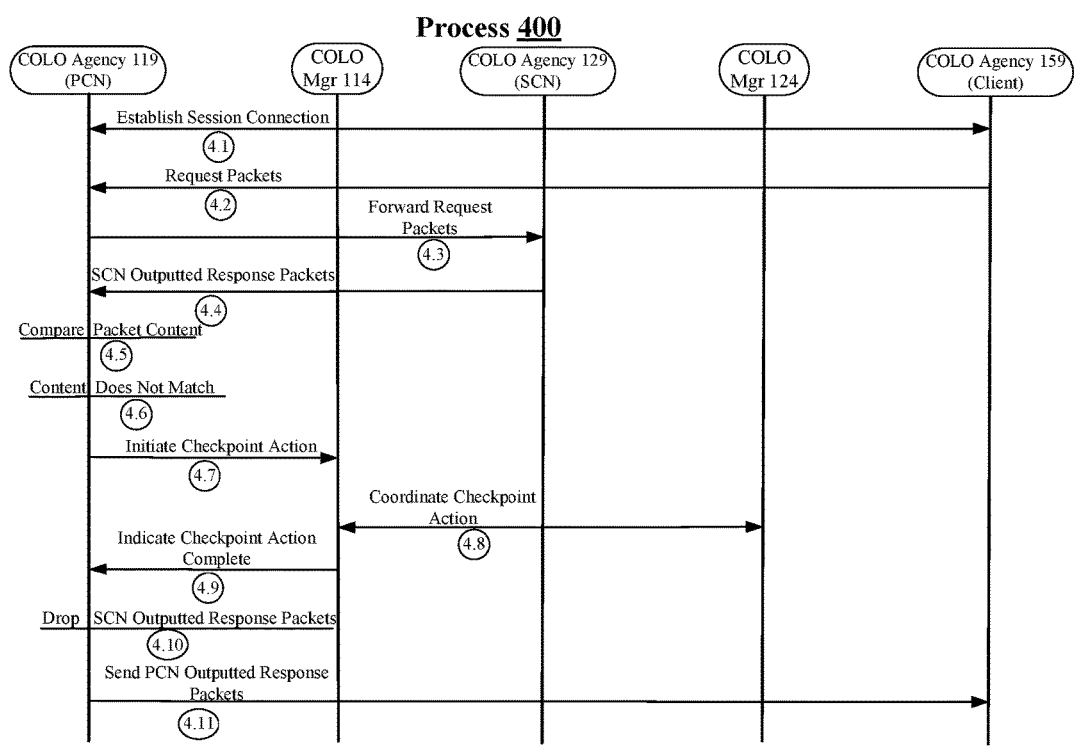
FIG. 4 illustrates an example second process.

FIG. 4 illustrates a second example process. In some examples, as shown in FIG. 4, the second example process includes process 400. Process 400 may be for maintaining reliable PCNs and SCNs where a single session connection is maintained between the server hosting the PCN and a client. For these examples, elements of system 100 as shown in FIG. 1 such as COLO agencies 119, 129 and 159 and COLO managers 114 and 124 may be related to process 300. Also session connection flow 200 as shown in FIG. 2 may also be related to process 300. However, the example process 300 is not limited to implementations using elements of system 100 or session connection flow 200 shown in FIGS. 1-2.

Beginning at process 4.1 (Establish Session Connection), logic and/or features of COLO agencies 119 and 159 may establish a session connection. In some examples, the session connection may by session connection 143. For these examples, COLO agency 159 may not need multiple threads to manage multiple session connections between COLO agencies located with both a PCN and an SCN. Session connection 143 may be maintained by COLO agency 159 to send request packets generated by or originating from client application 152 to application(s) 101 executed by PCN 112 and to receive outputted response packets generated by or originating from application(s) 101 executed by PCN 112.

Moving to process 4.2 (Request Packets), logic and/or features of COLO agency 119 may receive request packets sent from client 150 via session connection 143. In some examples, the request packets may have been generated by or originating from client application 152.

Moving to process 4.3 (Forward Request Packets, logic and/or features of COLO agency 119 may forward the request packets to COLO agency 129. In some examples, the request packets may then be separately processed by application(s) 101 that is separately executed by PCN 112 and SCN 122.

Moving to process 4.4 (SCN Outputted Response Packets), logic and/or features of COLO agency 129 may send outputted response packets generated by or originating from application(s) 101 executed by SCN 122 to COLO agency 119. In some examples, internal network 130 may be used to send these outputted response packets to COLO agency 119 (e.g., via an internal network communication channel).

Moving to process 4.5 (Compare Packet Content), logic and/or features of COLO agency 119 may compare content of outputted response packets originating from the separately executed application(s) 101 by PCN 112 and SCN 122. In some examples, as part of a COLO procedure, the logic and/or features of COLO agency 119 may determine the content matches within a given difference threshold. Process 4.5 is different from process 300 in that comparisons are made before outputted response packets are sent to COLO agency 159. This may conserve network transport resources as less packets are sent over network 140 which may be more resource intensive compared to sending outputted response packets over internal network 130. If the content matches, the process may skip process 4.6 to 4.9 and move to process 4.10. Otherwise, the process moves to process 4.6.

Moving to process 4.6 (Content Does Not Match), logic and/or features of COLO agency 119 may determine that the content of the outputted response packets does not match.

Moving to process 4.7 (Initiate Checkpoint Action), logic and/or features of COLO agency 119 may initiate a checkpoint action with COLO manager 114 at primary node/server 110.

Moving to process 4.8 (Coordinate Checkpoint Action), COLO manager 114 at primary node/server 110 may coordinate a checkpoint action with COLO manager 124 at secondary node/server 120. In some examples, COLO manager 114 may use container checkpoint 113 to determine the current operational state of PCN 112 and provide information from container checkpoint 113 to enable COLO manager 124 to synchronize the operational state of SCN 122 with the operational state of PCN 112.

Moving to process 4.9 (Indicate Checkpoint Action Complete), COLO manager 114 may send an indication to COLO agency 119 that the checkpoint action is complete. In other words, the operational state of PCN 112 has been synchronized with the operational state of SCN 122.

Moving to process 4.10 (Drop SCN Outputted Response Packets), logic and/or features of COLO agency 119 may drop outputted response packets originating from application(s) 101 executed by SCN 122. In some examples, the outputted response packets may be dropped following receipt of the indication that the checkpoint action was completed. In other examples, as mentioned above for process 3.7. If the content matched, the SCN outputted response packets may be dropped following this determination.

Moving to process 4.11 (Send PCN Outputted Response Packets), logic and/or features of COLO agency 119 may send the outputted response packets originating from application(s) 101 executed by PCN 112 to COLO agency 159. In some examples, the PCN outputted response packets may be sent via session connection 143 to COLO agency 159. COLO agency 159 may then forward the PCN outputted response packets to client applications 152. The process may then come to an end.

In other examples, rather than the logic and/or features of COLO agency 119 comparing the packet content, both PCN and SCN outputted response packets may be forwarded to COLO agency 159. For these examples, logic and/or features at COLO agency 159 may do the comparison as mentioned above at process 4.4 and if the content does not match send an indication to COLO agency 119 that the content does not match. COLO agency 119 may then initiate a checkpoint action as mentioned above for process 4.7. Also, COLO agency 119 may forward an indication to COLO agency 159 that the checkpoint action is complete. COLO agency 159 may then drop the SCN outputted response packets and forward the PCN outputted response packets to client application 152.

Figure 5:
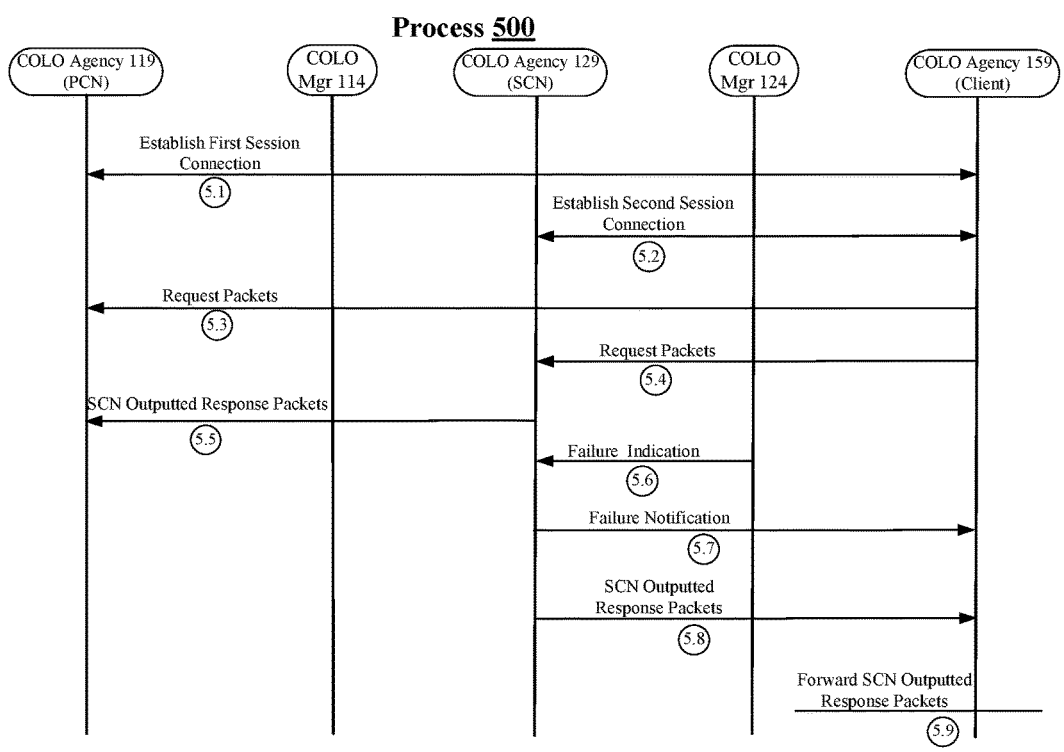
FIG. 5 illustrates an example third process.

FIG. 5 illustrates a third example process. In some examples, as shown in FIG. 5, the third example process includes process 500. Process 500 may be for maintaining reliable PCNs and SCNs at servers having separate session connections with a client and having the PCN forward outputted response packets from both the PCN and SCN to the client. For these examples, elements of system 100 as shown in FIG. 1 such as COLO agencies 119, 129 and 159 and COLO managers 114 and 124 may be related to process 500. Also session connection flow 200 as shown in FIG. 2 may also be related to process 500. However, the example process 500 is not limited to implementations using elements of system 100 or session connection flow 200 shown in FIGS. 1-2.

Beginning at process 5.1 (Establish First Session Connection), logic and/or features of COLO agencies 119 and 159 may establish a first session connection. In some examples, the first session connection may by session connection 143. Session connection 143 may be maintained by thread 153 of COLO agency 159 to send request packets generated by or originating from client application 152 to application(s) 101 executed by PCN 112 and to receive outputted response packets generated by or originating from application(s) 101 executed by PCN 112.

Moving to process 5.2 (Establish Second Session Connection), logic and/or features of COLO agencies 129 and 159 may establish a second session connection. In some examples, the second session connection may by session connection 145. Session connection 145 may be maintained by thread 155 of COLO agency 159 to send request packets generated by or originating from client application 152 to application(s) 101 executed by SCN 122 and to receive outputted response packets generated by or originating from application(s) 101 executed by SCN 122.

Moving to process 5.3 (Request Packets), logic and/or features of COLO agency 119 may receive request packets sent from client 150 via session connection 143. In some examples, the request packets may have been generated by or originating from client application 152.

Moving to process 5.4 (Request Packets), logic and/or features of COLO agency 129 may receive request packets sent from client 150 via session connection 145. In some examples, as mentioned above, the request packets may have been generated by or originating from client application 152.

Moving to process 5.5 (SCN outputted Response Packets), logic and/or features of COLO agency 129 may send outputted response packets generated by or originating from applications(s) 101 executed by SCN 122 to COLO agency 119. According to some examples, logic and/or features of COLO agency 119 may be arranged to conduct the comparison of the content of SCN outputted response packets to content of PCN outputted response packets. For these examples, COLO agency 119 may then either initiate a checkpoint action (if content did not match) or cause the SCN outputted response packets to be dropped (if content matched) without a checkpoint action and the PCN outputted response packets forwarded.

Moving to process 5.6 (Failure Indication), COLO manager 124 at secondary node/server 120 may have determined based on monitoring heartbeat 115 that primary node/server 110 has failed or is about to fail. In some examples, this failure may have occurred before COLO agency 119 at primary node/server 110 was able to complete its comparison of the content of the PCN/SCN outputted response packets.

Moving to process 5.7 (Failure Notification), logic and/or features of COLO agency 129 may send a notification to COLO agency 159 indicating the failure or imminent failure of primary node/server 110. According to some examples, the notification may provide an advanced notice that instead of COLO agency 119 sending the outputted response packets, COLO agency 129 would be sending the outputted response packets.

Moving to process 5.8 (SCN Outputted Response Packets), logic and/or features of COLO agency 129 may cause the SCN outputted response packets previously sent to COLO agency 119 at process 5.5 to be sent to COLO agency 159. In some examples, the need to send the SCN outputted response packets may be due to the failure of primary node/server 110 possibly causing the these outputted response packets to be lost or corrupted before being sent to COLO agency 159.

Moving to process 5.9 (Forward SCN Outputted Response Packets), logic and/or features of COLO agency 159 may forward the SCN outputted response packets to client application 152. The process then comes to an end.

Figure 6:
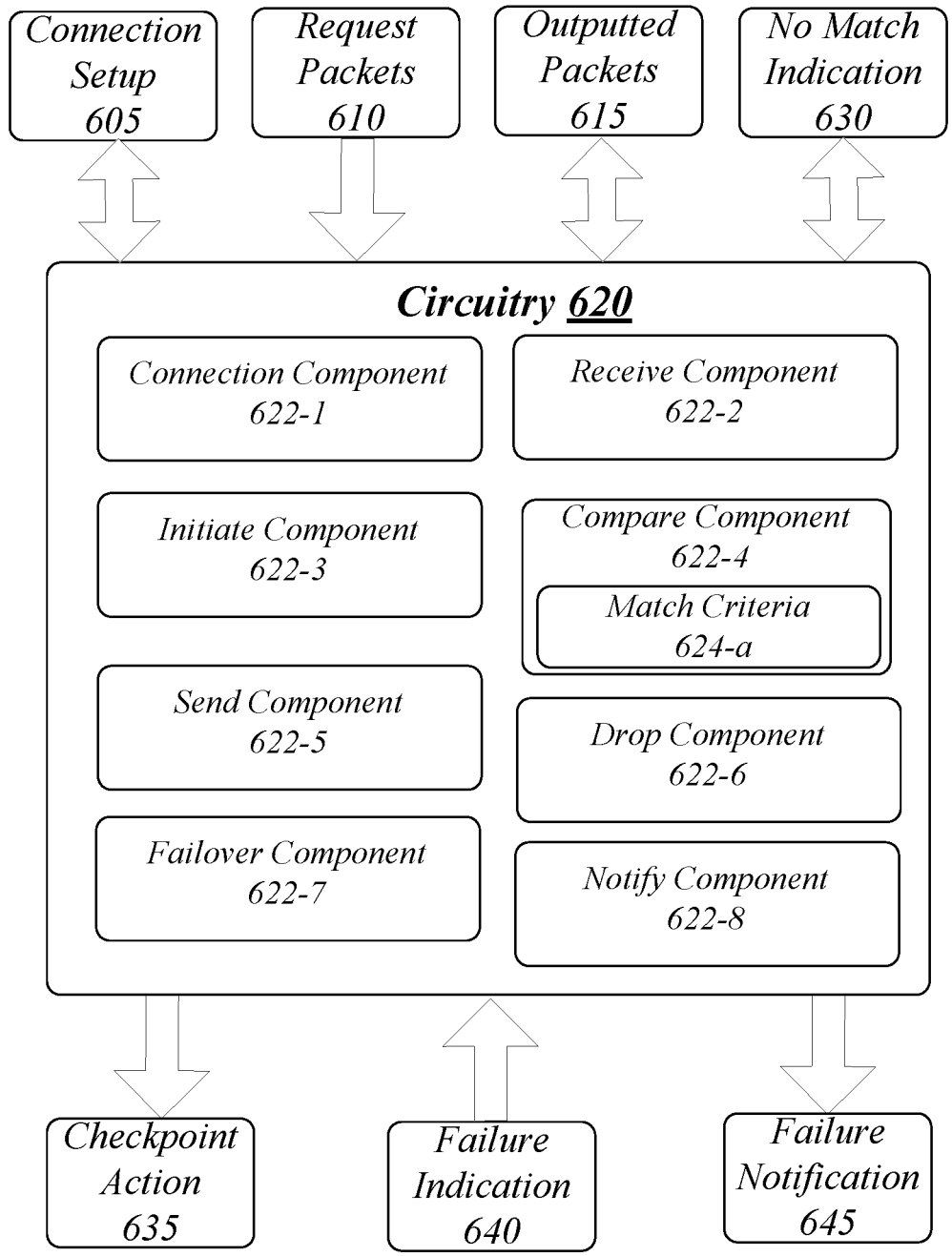
FIG. 6 illustrates an example block diagram for a first apparatus.

FIG. 6 illustrates an example block diagram for an apparatus 600. As shown in FIG. 6, the first apparatus includes an apparatus 600. Although apparatus 600 shown in FIG. 6 has a limited number of elements in a certain topology, it may be appreciated that the apparatus 600 may include more or less elements in alternate topologies as desired for a given implementation.

According to some examples, apparatus 600 may be supported by circuitry 620 maintained at a node/server arranged to host a PCN or SCN capable of separately executing one or more applications (e.g., application(s) 101). Circuitry 620 may be arranged to execute one or more software or firmware implemented modules or components 622-a. It is worthy to note that "a" and "b" and "c" and similar designators as used herein are intended to be variables representing any positive integer. Thus, for example, if an implementation sets a value for a=8, then a complete set of software or firmware for components 622-a may include components 622-1, 622-2, 622-3, 622-4, 622-5, 622-6, 622-7 or 622-8. The examples presented are not limited in this context and the different variables used throughout may represent the same or different integer values. Also, these "components" may be software/firmware stored in computer-readable media, and although the components are shown in FIG. 6 as discrete boxes, this does not limit these components to storage in distinct computer-readable media components (e.g., a separate memory, etc.).

According to some examples, circuitry 620 may include a processor or processor circuitry. As mentioned above, circuitry 620 may be part of circuitry at a node/server (e.g., primary node/server 110 or secondary node/server 120) that may include processing cores or elements. The circuitry including one or more processing cores can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Atom®, Celeron®, Core (2) Duo®, Core i3, Core i5, Core i7, Itanium®, Pentium®, Xeon®, Xeon Phi® and XScale® processors; and similar processors. According to some examples circuitry 620 may also include an application specific integrated circuit (ASIC) and at least some components 622-a may be implemented as hardware elements of the ASIC.

According to some examples, apparatus 600 may be at a node/server (e.g., located at a data center) coupled with a client via a session connection routed through a network (e.g., external to the data center). For these examples, the node/server may be arranged to host a PCN or an SCN. The PCN and the SCN may be capable of separately executing a first application. For these examples, apparatus 600 may include a connection component 622-1. Connection component 622-1 may be executed by circuitry 620 to establish the session connection between a COLO agency implemented within a first socket library for use by the first application and a second COLO agency implemented within a second socket library for used by a second application executed at the client. In some examples, connection setup 605 may include the exchange of information to establish the session connection.

In some examples, apparatus 600 may also include a receive component 622-2. Receive component 622-2 may be executed by circuitry 620 to receive request packets originating from the second application at the client. According to some examples, the request packets may be included in request packet 610.

According to some examples, apparatus 600 may also include an initiate component 622-3. Initiate component 622-3 may be executed by circuitry 620 to initiate a checkpoint action responsive to receiving an indication that content of outputted response packets originating from the separately executed first application by the PCN and the SCN does not match. For these examples, the checkpoint action may include a synchronization of an operational state of the PCN with an operational state of the SCN. For these example, checkpoint action 635 may represent the initialization of the checkpoint action.

In some examples, apparatus 600 may also include a compare component 622-4. Compare component 622-4 may be executed by circuitry 620 to compare content of outputted response packets originating from the first application executed by the SCN to content of outputted response packets originating from the first application executed by the PCN to determine that the content does not match. Compare component 622-4 may maintain match criteria with match criteria 624-a (e.g., in a lookup table (LUT)) for use in determining whether the content matches. Compare component 622-4 may be utilized in examples where apparatus 600 is included in the primary node/server that hosts the PCN. In these examples, SCN outputted response packets may be forwarded by the SCN to the PCN for compare component 622-4 to conduct the comparison. These SCN outputted response packets may be included in inbound outputted packets 615.

According to some examples, apparatus 600 may also include a send component 622-5. In some first examples, apparatus 600 may be included in the primary node/server that hosts the PCN and that also utilizes compare component 622-4 to compare content of the outputted response packets. For these first examples, send component 622-5 may be executed by circuitry 620 to send the outputted response packets originating from the first application executed by the PCN to the second COLO agency via the session connection. The outputted response packets may be include in outbound outputted packets 615 and may be sent following completion of the checkpoint action. In some second examples, apparatus 600 may be included in the primary node/server however comparison of content of the outputted response packets may be performed by the second COLO agency at the client. For these second examples, send component 622-5 may be executed by circuitry 620 to send the outputted response packets originating from the first application executed by the PCN or the SCN to the second COLO agency via the session connection. In some third examples, apparatus 600 may be included in the secondary node/server. For these third examples, send component 622-5 may be executed by circuitry 620 to forward outputted response packets originating from the first application executed by the SCN to a third COLO agency implemented within a third socket library for use by the first application executed by the PCN hosted by a second server (e.g., a primary node/server), the third COLO agency at the second server to send the indication that content of outputted response packets originating from the separately executed first application by the PCN and the SCN does not match. This indication may be included in no match indication 630. In some fourth examples, apparatus 600 may be included in the secondary node/server. For these fourth examples, send component 622-5 may be executed by circuitry 620 to forward outputted response packets originating from the first application executed by the SCN to a third COLO agency implemented within a third socket library for use by the first application executed by the PCN hosted by a second server. The third COLO agency at the second server to send the indication that content of outputted response packets originating from the separately executed first application by the PCN and the SCN does not match. The indication may be included in no match indication 630.

In some examples, apparatus 600 may also include a drop component 622-6. Drop component 622-6 may be executed by circuitry 620 to drop the outputted response packets form the first application executed by the SCN. According to some examples where apparatus 600 is included in the primary node/server and utilizes compare component 622-4, drop component 622-6 may be further utilized to drop the SCN outputted response packets.

According to some examples, apparatus 600 may also include a failover component 622-7. Failover component 622-7 may be executed by circuitry 620 to receive an indication from the COLO manager at the server that the second server has failed since the sending of the outputted response packets originating from the first application executed by the SCN. For these examples, apparatus 600 is included in the secondary node/server and the failure indication may be included in failure indication 640.

In some examples, apparatus 600 may also include a notify component 622-8. Notify component 622-8 may be executed by circuitry 620 to notify the second COLO agency of the failure. For these examples, apparatus 600 is included in the secondary node/server and the failure notification 645 may include a notification of the failure of a second server/node hosting the PCN. Also, for these examples, send component 622-5 may resend the outputted response packets originating from the first application executed by the SCN to the second COLO agency via the session connection.

Included herein is a set of logic flows representative of example methodologies for performing novel aspects of the disclosed architecture. While, for purposes of simplicity of explanation, the one or more methodologies shown herein are shown and described as a series of acts, those skilled in the art will understand and appreciate that the methodologies are not limited by the order of acts. Some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

A logic flow may be implemented in software, firmware, and/or hardware. In software and firmware embodiments, a logic flow may be implemented by computer executable instructions stored on at least one non-transitory computer readable medium or machine readable medium, such as an optical, magnetic or semiconductor storage. The embodiments are not limited in this context.

Figure 7:
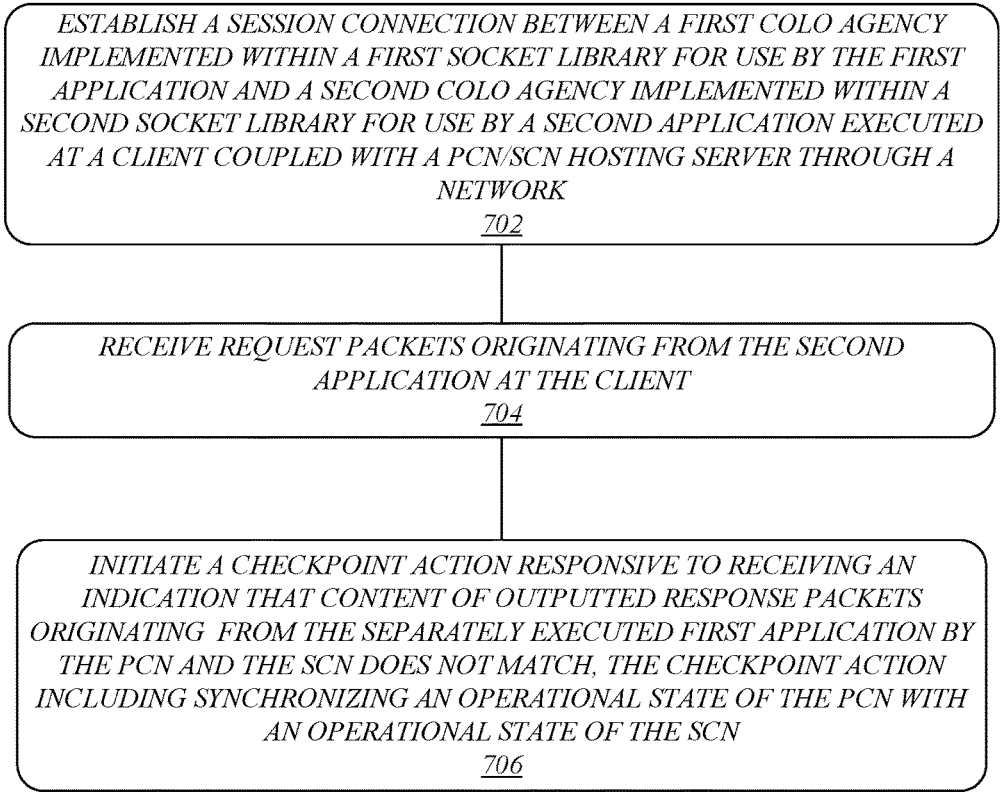
FIG. 7 illustrates an example of a first logic flow.

FIG. 7 illustrates an example of a first logic flow. As shown in FIG. 7 the first logic flow includes a logic flow 700. Logic flow 700 may be representative of some or all of the operations executed by one or more logic, features, or devices described herein, such as apparatus 600. More particularly, logic flow 700 may be implemented by at least connection component 622-1, receive component 622-2 or initiate component 622-3.

According to some examples, logic flow 700 at block 702 may establish a session connection between a first COLO agency implemented within a first socket library for use by the first application and a second COLO agency implemented within a second socket library for use by a second application executed at a client coupled with the server through a network. For these examples, connection component 622-1 may establish the session connection.

In some examples, logic flow 700 at block 704 may receive request packets originating from the second application at the client. For these examples, receive component 622-1 may receive the request packets.

According to some examples, logic flow 700 at block 706 may initiate a checkpoint action responsive to receiving an indication that content of outputted response packets originating from the separately executed first application by the PCN and the SCN does not match, the checkpoint action including synchronizing an operational state of the PCN with an operational state of the SCN. For these examples, initiate component 622-3 may initiate the checkpoint action.

FIG. 8 illustrates an example of a first storage medium. As shown in FIG. 8, the first storage medium includes a storage medium 800. The storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flow 700. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 9:
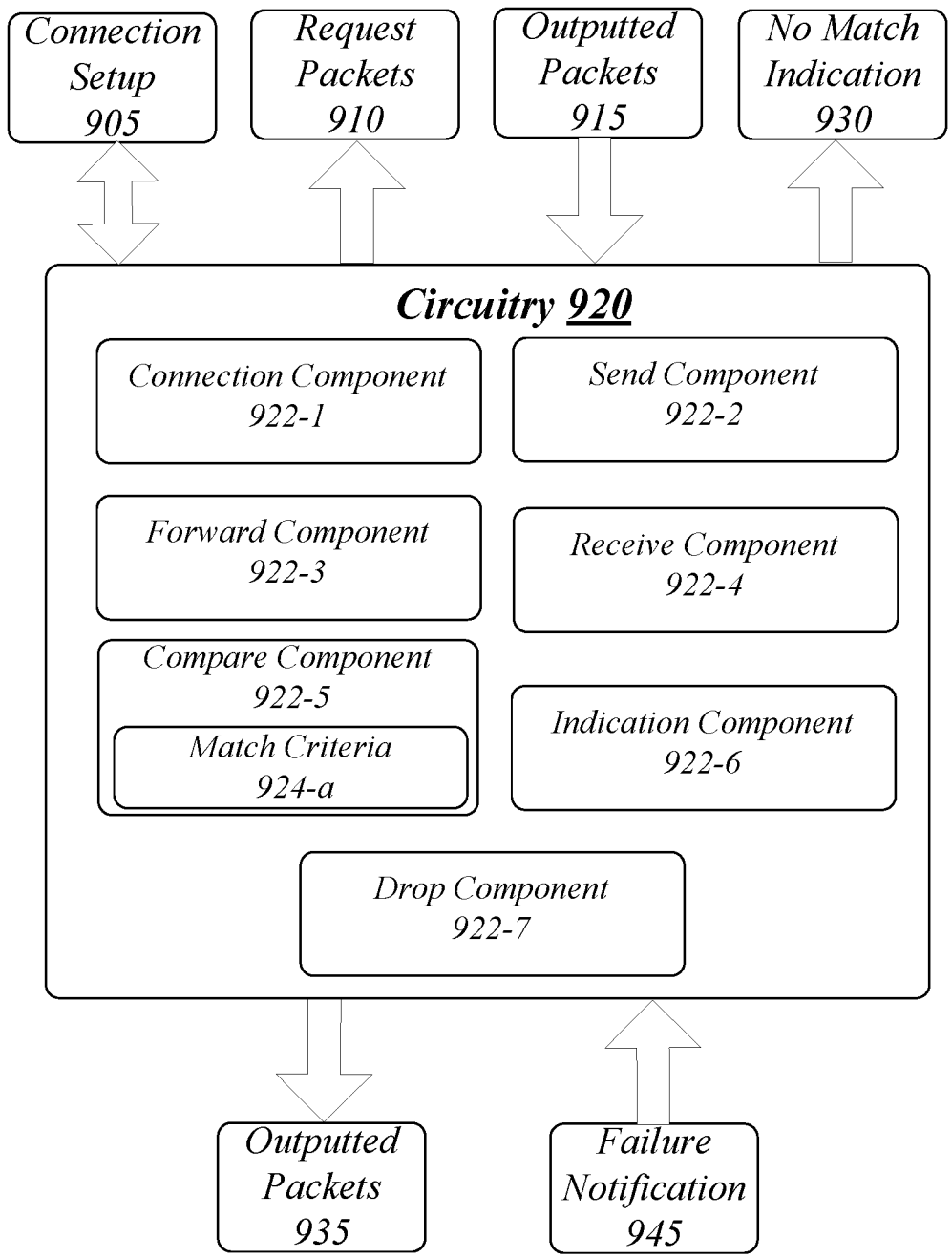
FIG. 9 illustrates an example of a block diagram for a second apparatus.

FIG. 9 illustrates a block diagram for an example second apparatus. As shown in FIG. 9, the example second apparatus includes apparatus 900. Although apparatus 900 shown in FIG. 9 has a limited number of elements in a certain topology, it may be appreciated that the apparatus 900 may include more or less elements in alternate topologies as desired for a given implementation.

The apparatus 900 may be supported by circuitry 920 maintained at a client computing device coupled to a server/node (e.g., via a session connection) through a network. Circuitry 920 may be arranged to execute one or more software components 922-a. It is worthy to note that "a" and "b" and "c" and similar designators as used herein are intended to be variables representing any positive integer. Thus, for example, if an implementation sets a value for a=7, then a complete set of software components 922-a may include components 922-1, 922-2, 922-3, 922-4, 922-5, 922-6 or 922-7. The examples are not limited in this context.

In some examples, as shown in FIG. 9, apparatus 900 includes circuitry 920. Circuitry 920 may be generally arranged to execute one or more software components 922-a. Circuitry 920 can be any of various commercially available processors to include but not limited to the processors mentioned above for apparatus 600. Also, according to some examples, circuitry 920 may also be an ASIC and at least some components 922-a may be implemented as hardware elements of the ASIC.

According to some examples, apparatus 900 may be at a client coupled with a node/server via a session connection routed through a network (e.g., external to the data center). For these examples, the node/server may be arranged to host a PCN or an SCN. The PCN and the SCN may be capable of separately executing a first application. For these examples, apparatus 900 may include a connection component 922-1. Connection component 922-1 may be executed by circuitry 920 to establish a session connection between a first COLO agency implemented within a first socket library for use by a second application hosted by the client and a second COLO agency implemented within a second socket library for use by the second application separately executed by the PCN or the SCN. In some examples, connection setup 905 may include the exchange of information to establish the session connection.

In some examples, apparatus 900 may also include a send component 922-2. Send component 922-2 may be executed by circuitry 920 to cause request packets to be sent via the session connection. The request packets may be destined for processing by the first application separately executed by the PCN or SCN. For these examples, the request packets may have been generated by or originating from the second application hosted by the client and may be included in request packets 910.

According to some examples, apparatus 900 may also include a forward component 922-3. Forward component 922-3 may be executed by circuitry 920 to forward to the second application received outputted response packets originating from the first application executed by the PCN following completion of a checkpoint action by a COLO manager at the server hosting the PCN or the SCN. The checkpoint action may synchronize a state of the PCN with a state of the SCN. According to some examples, outputted packets 915 may include outputted response packets received from the first application jointly executed by the PCN and SCN. However, as mentioned more below, in some examples, the outputted response packets from the SCN may be dropped following the checkpoint action and then the outputted response packets originating from the first application executed by the PCN are forwarded. These forwarded outputted response packets may be included in outputted packets 935.

In some examples, apparatus 900 may also include a receive component 922-4. In some first examples, receive component 922-4 may be executed by circuitry 920 to receive outputted response packets originating from the first application executed by the PCN and executed by the SCN via the single established session connection. In some second examples, receive component 922-4 may be executed by circuitry 920 to receive outputted response packets originating from the first application executed by the PCN via the established session connection and receiving outputted response packets originating from the first application executed by the SCN via a second session connection. For these second examples, the second session connection may be established by connection component 922-1 and may be between the first COLO agency and a second COLO agency implemented with a second socket library. The second socket library for use by the first application executed by the SCN hosted by a second server that may be coupled with the client through the network. For both these first and second examples, the received outputted packets may be included in outputted packets 915.

According to some examples, apparatus 900 may also include a compare component 922-5. Compare component 922-5 may be executed by circuitry 920 to compare a first content of the outputted response packets originating from the second application executed by the PCN to a second content of the outputted response packets originating from the second application executed by the SCN to determine whether the content matches. For these examples, the outputted response packets originating from the first application executed by the PCN and SCN may be received via separate session connections or may be gathered by logic and/or features at the PCN (e.g., a COLO agency) and received via a single session connection. According to some examples, compare component 922-5 may maintain match criteria with match criteria 924-a (e.g., in a LUT) for use in determining whether the content matches.

In some examples, apparatus 900 may also include an indication component 922-6. Indication component 922-6 may be executed by circuitry 920 to cause the checkpoint action by the COLO manager by sending an indication to the second COLO agency that the content does not match. For these examples, the indication may be sent via the session connection established with the second COLO agency and may be included in no match indication 930.

According to some examples, apparatus 900 may also include a drop component 922-7. In some first examples, drop component 922-7 may be executed by circuitry 920 to drop the outputted response packets originating from the first application executed by the SCN responsive to an indication that checkpoint action was completed and cause the outputted response packets originating from the first application executed by the PCN to be forwarded to the second application. In some second examples, drop component 922-7 may be executed by circuitry 920 to drop the outputted response packets originating from the first application executed by the SCN responsive to an indication that the content does not match. For these second examples, no checkpoint action was needed as the content of the outputted packets were determined to match (e.g., within a difference threshold or was identical).

In some examples, receive component 922-4 may receive a failure notification 945 to indicate that the server hosting the SCN has detected a failure of another or second server hosting the PCN. Failure notification 945 may be received in examples where the COLO agency for the PCN was forwarding outputted response packets originating from the first application executed by the PCN and executed by the SCN via the established session connection. Failure notification 945 may also indicate that the COLO agency for the SCN may soon resend outputted response packets. In some first examples, the resending of the outputted response packets may be sent via a second, previously established session connection (e.g., by connection component 922-1). According to some second examples where a session connection between the COLO agency for the SCN and the second COLO agency at the client has not been previously established, a new session connection may be established by connection component 922-1 before the outputted response packets are resent.

FIG. 10 illustrates an example of a second logic flow. As shown in FIG. 10 the second logic flow includes a logic flow 1000. Logic flow 1000 may be representative of some or all of the operations executed by one or more logic, features, or devices described herein, such as apparatus 900. More particularly, logic flow 1000 may be implemented by at least connection component 922-1, send component 922-2 or forward component 922-3. According to some examples, logic flow 100 may be implemented at circuitry for a client arranged to host a first application.

According to some examples, logic flow 1000 at block 1002 may establish a session connection between a first COLO agency implemented within a first socket library for use by the first application and a second COLO agency implemented within a second socket library for use by a second application separately executed by a PCN or an SCN, the PCN or SCN hosted by a server coupled with the client through a network. For these examples, connection component 922-4 may establish the session connection.

In some examples, logic flow 1000 at block 1004 may cause request packets to be sent via the session connection, the request packets destined for processing by the second application separately executed by the PCN or SCN. For these examples, send component 922-2 may cause the request packets to be sent.

According to some examples, logic flow 1000 at block 1006 may forward to the first application received outputted response packets originating from the second application executed by the PCN following completion of a checkpoint action by a COLO manager at the server hosting the PCN or the SCN, the checkpoint action to synchronize a state of the PCN with a state of the SCN. For these examples, forward component 922-3 may forward the received outputted response packets to the first application.

FIG. 11 illustrates an example of a second storage medium. As shown in FIG. 11, the second storage medium includes a storage medium 1100. The storage medium 1100 may comprise an article of manufacture. In some examples, storage medium 1100 may include any non-transitory computer readable medium or machine readable medium, such as an optical, magnetic or semiconductor storage. Storage medium 1100 may store various types of computer executable instructions, such as instructions to implement logic flow 1000. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 12:
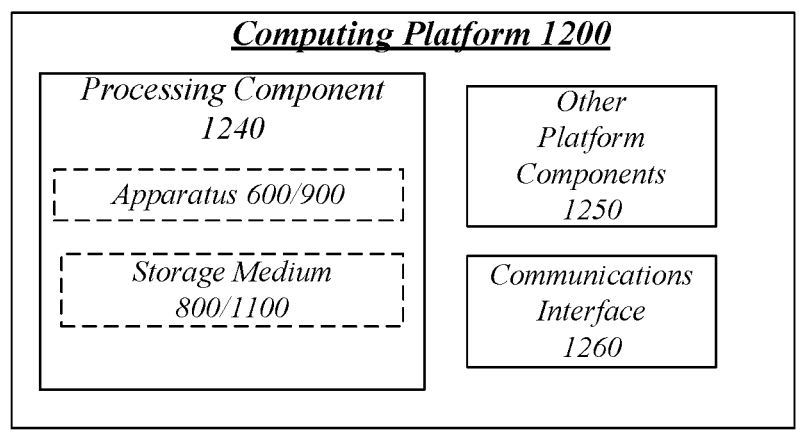
FIG. 12 illustrates an example computing platform.

FIG. 12 illustrates an example computing platform 1200. In some examples, as shown in FIG. 12, computing platform 1200 may include a processing component 1240, other platform components 1250 or a communications interface 1260. According to some examples, computing platform 1200 may be implemented in server/node or client computing device. The server/node or client computing device may be capable of coupling through a network.

According to some examples, processing component 1240 may execute processing operations or logic for apparatus 600/900 and/or storage medium 800/1100. Processing component 1240 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 1250 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 1260 may include logic and/or features to support a communication interface. For these examples, communications interface 1260 may include one or more communication interfaces that operate according to various communication protocols or standards to communicate over direct or network communication links or channels. Direct communications may occur via use of communication protocols or standards described in one or more industry standards (including progenies and variants) such as those associated with the PCIe specification. Network communications may occur via use of communication protocols or standards such those described in one or more Ethernet standards promulgated by IEEE. For example, one such Ethernet standard may include IEEE 802.3. Network communication may also occur according to one or more OpenFlow specifications such as the OpenFlow Hardware Abstraction API Specification.

As mentioned above computing platform 1200 may be implemented in a server/node or client computing device. Accordingly, functions and/or specific configurations of computing platform 1200 described herein, may be included or omitted in various embodiments of computing platform 1200, as suitably desired for a server/node or client computing device.

The components and features of computing platform 1200 may be implemented using any combination of discrete circuitry, application specific integrated circuits (ASICs), logic gates and/or single chip architectures. Further, the features of computing platform 1200 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary computing platform 1200 shown in the block diagram of FIG. 12 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The follow examples pertain to additional examples of technologies disclosed herein.

Example 1

An example apparatus at a server arranged to host a PCN or an SCN capable of separately executing a first application may include circuitry. The apparatus may also include a connection component for execution by the circuitry to establish a session connection between a first COLO agency implemented within a first socket library for use by the first application and a second COLO agency implemented within a second socket library for use by a second application executed at a client coupled with the server through a network. The apparatus may also include a receive component for execution by the circuitry to receive request packets originating from the second application at the client. The apparatus may also include an initiate component for execution by the circuitry to initiate a checkpoint action responsive to receiving an indication that content of outputted response packets originating from the separately executed first application by the PCN and the SCN does not match. For these examples, the checkpoint action may include a synchronization of an operational state of the PCN with an operational state of the SCN.

Example 2

The apparatus of example 1, the server may be the host for the PCN.

Example 3

The apparatus of example 2, the receive component may receive the outputted response packets originating from the first application executed by the SCN that is hosted by a second server. For these examples, the outputted response packets may originate from the first application executed by the SCN received via an internal network communication channel coupling the server to the second server. The apparatus may also include a compare component for execution by the circuitry to compare content of outputted response packets originating from the first application executed by the SCN to content of outputted response packets originating from the first application executed by the PCN to determine that the content does not match. The initiate component may initiate the checkpoint action with a COLO manager at the server. The COLO manager at the server may coordinate the checkpoint action with a COLO manager at the second server. The apparatus may also include a send component for execution by the circuitry to send the outputted response packets originating from the first application executed by the PCN to the second COLO agency via the session connection. The outputted response packets may originate from the first application executed by the PCN sent following completion of the checkpoint action. The apparatus may also include a drop component for execution by the circuitry to drop the outputted response packets originating from the first application executed by the SCN.

Example 4

The apparatus of example 2 may also include a send component for execution by the circuitry to send the outputted response packets originating from the first application executed by the PCN or the SCN to the second COLO agency via the session connection. For these examples, the receive component may receive the indication that content of outputted response packets originating from the separately executed first application by the PCN and the SCN does not match from the second COLO agency at the client. The second COLO agency may be capable of receiving outputted response packets originating from the first application executed by both the PCN and the SCN and comparing the outputted response packets originating from the first application executed by the SCN and the PCN to determine that the content does not match. Also, the initiate component may initiate the checkpoint action with a COLO manager at the server. The COLO manager at the server may coordinate the checkpoint action with another COLO manager at a second server arranged to host the SCN.

Example 5

The apparatus of example 1, the server may be the host for the SCN.

Example 6

The apparatus of example 5 may include a send component for execution by the circuitry to forward outputted response packets originating from the first application executed by the SCN to a first COLO agency implemented within a first socket library for use by the first application executed by the PCN hosted by a second server. The first COLO agency at the second server may send the indication that content of outputted response packets originating from the separately executed first application by the PCN and the SCN does not match. For these examples, the initiate component may initiate the checkpoint action with a COLO manager at the server. The COLO manager at the server may coordinate the checkpoint action with a COLO manager at the second server.

Example 7

The apparatus of example 6 may also include a failover component for execution by the circuitry to receive an indication from the COLO manager at the server that the second server has failed since the sending of the outputted response packets originating from the first application executed by the SCN. The apparatus may also include a notify component for execution by the circuitry to notify the second COLO agency of the failure. For these examples, the send component may resend the outputted response packets originating from the first application executed by the SCN to the second COLO agency via the session connection.

Example 8

The apparatus of example 5 may also include a send component for execution by the circuitry to send the outputted response packets originating from the first application executed by the SCN to the second COLO agency at the client via the session connection. The receive component may receive the indication that content of outputted response packets originating from the separately executed first application by the PCN and the SCN does not match from the second COLO agency. The second COLO agency may be capable of receiving outputted response packets originating from the first application executed by both the PCN and the SCN and comparing outputted response packets originating from the first application executed by the SCN and the PCN to determine that the content does not match. Also, for these examples, the initiate component may initiate the checkpoint action with a COLO manager at the server. The COLO manager at the server may coordinate the checkpoint action with another COLO manager at a second server arranged to host the PCN.

Example 9

The apparatus of example 1 may also include a digital display coupled to the circuitry to present a user interface view.

Example 10

An example method may implemented at circuitry for a server arranged to host a PCN or an SCN. The PCN and the SCN may be capable of separately executing a first application. The method may include establishing a session connection between a first COLO agency implemented within a first socket library for use by the first application and a second COLO agency implemented within a second socket library for use by a second application executed at a client coupled with the server through a network. The method may also include receiving request packets originating from the second application at the client. The method may also include initiating a checkpoint action responsive to receiving an indication that content of outputted response packets originating from the separately executed first application by the PCN and the SCN does not match. For these examples, the checkpoint action may include synchronizing an operational state of the PCN with an operational state of the SCN.

Example 11

The method of example 10, the server may be the host for the PCN.

Example 12

The method of example 11, receiving, at the server, the outputted response packets originating from the first application executed by the SCN that is hosted by a second server. The outputted response packets may originate from the first application executed by the SCN received via an internal network communication channel coupling the server to the second server. The method may also include comparing the outputted response packets originating from the first application executed by the SCN to outputted response packets originating from the first application executed by the PCN to determine that the content does not match. The method may also include initiating the checkpoint action with a COLO manager at the server. The COLO manager at the server may coordinate the checkpoint action with a COLO manager at the second server. The method may also include sending the outputted response packets originating from the first application executed by the PCN to the second COLO agency via the session connection. The outputted response packets may originate from the first application executed by the PCN and may have been sent following completion of the checkpoint action. The method may also include dropping the outputted response packets originating from the first application executed by the SCN.

Example 13

The method of example 11 may include sending the outputted response packets originating from the first application executed by the PCN or the SCN to the second COLO agency via the session connection. The method may also include receiving the indication that content of outputted response packets originating from the separately executed first application by the PCN and the SCN does not match from the second COLO agency at the client. The second COLO agency may be capable of receiving outputted response packets originating from the first application executed by both the PCN and the SCN and comparing the outputted response packets originating from the first application executed by the SCN to outputted response packets originating from the first application executed by the PCN to determine that the content does not match. The method may also include initiating the checkpoint action with a COLO manager at the server. The COLO manager at the server may coordinate the checkpoint action with another COLO manager at a second server arranged to host the SCN.

Example 14

The method of example 10, the server may be the host for the SCN.

Example 15

The method of example 14 may include forwarding outputted response packets originating from the first application executed by the SCN to a first COLO agency implemented within a first socket library for use by the first application executed by the PCN hosted by a second server. The first COLO agency at the second server may send the indication that content of outputted response packets originating from the separately executed first application by the PCN and the SCN does not match. The method may also include initiating the checkpoint action with a COLO manager at the server. The COLO manager at the server may coordinate the checkpoint action with a COLO manager at the second server.

Example 16

The method of example 15 may include receiving an indication from the COLO manager at the server that the second server has failed since the sending of the outputted response packets originating from the first application executed by the SCN. The method may also include notifying the second COLO agency of the failure and resending the outputted response packets originating from the first application executed by the SCN to the second COLO agency via the session connection.

Example 17

The method of example 14 may include sending the outputted response packets originating from the first application executed by the SCN to the second COLO agency via the session connection. The method may also include receiving the indication that content of outputted response packets originating from the separately executed first application by the PCN and the SCN does not match from the second COLO agency at the client. The second COLO agency may be capable of receiving outputted response packets originating from the first application executed by both the PCN and the SCN and comparing the outputted response packets originating from the first application executed by the SCN to outputted response packets originating from the first application executed by the PCN to determine that the content does not match. The method may also include initiating the checkpoint action with a COLO manager at the server, the COLO manager at the server to coordinate the checkpoint action with another COLO manager at a second server arranged to host the PCN.

Example 18

An example at least one machine readable medium may include a plurality of instructions that in response to being executed by system at a server cause the system to carry out a method according to any one of examples 10 to 17.

Example 19

An example apparatus may include means for performing the methods of any one of examples 10 to 17.

Example 20

An example at least one machine readable medium may include a plurality of instructions that in response to being executed by a system at a server arranged to host a PCN or an SCN, the PCN and the SCN capable of separately executing a first application, the instructions may cause the system to establish a session connection. The session connection may be established between a first COLO agency implemented within a first socket library for use by the first application and a second COLO agency implemented within a second socket library for use by a second application executed at a client coupled with the server through a network. The instructions may also cause the system to receive request packets originating from the second application at the client and initiate a checkpoint action responsive to receiving an indication that content of outputted response packets originating from the separately executed first application by the PCN and the SCN does not match. For these examples, the checkpoint action may include synchronizing an operational state of the PCN with an operational state of the SCN.

Example 21

The at least one machine readable medium of example 20, the server may be the host for the PCN.

Example 22

The at least one machine readable medium of example 21. The instructions may further cause the system to receive, at the server, the outputted response packets originating from the first application executed by the SCN that is hosted by a second server. The outputted response packets originating from the first application executed by the SCN may be received via an internal network communication channel coupling the server to the second server. The instruction may also cause the system to compare content of outputted response packets originating from the first application executed by the SCN to content of outputted response packets originating from the first application executed by the PCN to determine that the content does not match. The instructions may also cause the system to initiate the checkpoint action with a COLO manager at the server, the COLO manager at the server to coordinate the checkpoint action with a COLO manager at the second server. The instructions may also cause the system to send the outputted response packets originating from the first application executed by the PCN to the second COLO agency via the session connection, the outputted response packets originating from the first application executed by the PCN sent following completion of the checkpoint action. The instructions may also cause the system to drop the outputted response packets originating from the first application executed by the SCN.

Example 23

The at least one machine readable medium of example 21, the instructions may further cause the system to send the outputted response packets originating from the first application executed by the PCN or the SCN to the second COLO agency via the session connection. The instructions may also cause the system to receive the indication that content of outputted response packets originating from the separately executed first application by the PCN and the SCN does not match from the second COLO agency at the client, the second COLO agency capable of receiving outputted response packets originating from the first application executed by both the PCN and the SCN and comparing the outputted response packets originating from the first application executed by the SCN to outputted response packets originating from the first application executed by the PCN to determine that the content does not match. The instructions may also cause the system to initiate the checkpoint action with a COLO manager at the server. For these examples, the COLO manager at the server may coordinate the checkpoint action with another COLO manager at a second server arranged to host the SCN.

Example 24

The at least one machine readable medium of example 20, the server may be the host for the SCN.

Example 25

The at least one machine readable medium of example 24, the instructions may further cause the system to forward outputted response packets originating from the first application executed by the SCN to a first COLO agency implemented within a first socket library for use by the first application executed by the PCN hosted by a second server. The first COLO agency at the second server may send the indication that content of outputted response packets originating from the separately executed first application by the PCN and the SCN does not match. The instructions may also cause the system to initiate the checkpoint action with a COLO manager at the server. For these examples, the COLO manager at the server may coordinate the checkpoint action with a COLO manager at the second server.

Example 26

The at least one machine readable medium of example 25, the instructions may further cause the system to receive an indication from the COLO manager at the server that the second server has failed since the sending of the outputted response packets originating from the first application executed by the SCN. The instructions may also cause the system to notify the second COLO agency of the failure and resend the outputted response packets originating from the first application executed by the SCN to the second COLO agency via the session connection.

Example 27

The at least one machine readable medium of example 24, the instructions may further cause the system to send the outputted response packets originating from the first application executed by the SCN to the second COLO agency via the session connection. The instructions may also cause the system to receive the indication that content of outputted response packets originating from the separately executed first application by the PCN and the SCN does not match from the second COLO agency at the client. The second COLO agency may be capable of receiving outputted response packets originating from the first application executed by both the PCN and the SCN and comparing the outputted response packets originating from the first application executed by the SCN to outputted response packets originating from the first application executed by the PCN to determine that the content does not match. The instructions may also cause the system to initiate the checkpoint action with a COLO manager at the server. The COLO manager at the server may coordinate the checkpoint action with another COLO manager at a second server arranged to host the PCN.

Example 28

An example apparatus at a client arranged to host a first application. The apparatus may include circuitry. The apparatus may also include a connection component for execution by the circuitry to establish a session connection between a first COLO agency implemented within a first socket library for use by the first application and a second COLO agency implemented within a second socket library for use by a second application separately executed by a PCN or an SCN, the PCN or SCN hosted by a server coupled with the client through a network. The apparatus may also include a send component for execution by the circuitry to cause request packets to be sent via the session connection. The request packets may be destined for processing by the second application separately executed by the PCN or SCN. The apparatus may also include a forward component for execution by the circuitry to forward to the first application received outputted response packets originating from the second application executed by the PCN following completion of a checkpoint action by a COLO manager at the server hosting the PCN or the SCN. For these examples, the checkpoint action may synchronize an operational state of the PCN with an operational state of the SCN.

Example 29

The apparatus of example 28, the PCN hosted by the server may be coupled with the client through the network and the SCN hosted by a second server may be coupled with the client through the network.

Example 30

The apparatus of example 29 may also include the connection component to establish a second session connection between the first COLO agency and a third COLO agency implemented with a third socket library for use by the second application executed by the SCN hosted by the second server. The send component may cause the request packets destined for processing by the second application executed by the PCN to be sent via the session connection and cause the request packets destined for processing by the second application executed by the SCN to be sent via the second session connection. The apparatus may also include a receive component for execution by the circuitry to receive outputted response packets originating from the second application executed by the PCN via the session connection and receive outputted response packets originating from the second application executed by the SCN via the second session connection. The apparatus may also include a compare component for execution by the circuitry to compare a first content of the outputted response packets originating from the second application executed by the PCN to a second content of the outputted response packets originating from the second application executed by the SCN to determine that the first and second contents do not match. The apparatus may also include an indication component for execution by the circuitry to cause the checkpoint action by the COLO manager by sending an indication to the second COLO agency that the first and second contents do not match. The apparatus may also include a drop component for execution by the circuitry to drop the outputted response packets originating from the second application executed by the SCN responsive to an indication that the checkpoint action was completed and cause the outputted response packets originating from the second application executed by the PCN to be forwarded to the first application.

Example 31

The apparatus of example 28, the PCN hosted by the server may be coupled with the client through the network. For these examples, the session connection established with the second COLO agency may be implemented within the second socket library for use by the second application executed by the PCN.

Example 32

The apparatus of example 31 may also include the send component to cause the request packets destined for processing by the second application separately executed by the PCN and the SCN to be sent via the session connection. The apparatus may also include a receive component for execution by the circuitry to receive outputted response packets originating from the second application executed by the PCN via the session connection. The forward component may cause the outputted response packets originating from the second application executed by the PCN to be forwarded to the first application.

Example 33

The apparatus of example 28 may also include a digital display coupled to the processor circuit to present a user interface view.

Example 34

An example method implemented at circuitry for a client arranged to host a first application. The example method may include establishing a session connection between a first COLO agency implemented within a first socket library for use by the first application and a second COLO agency implemented within a second socket library for use by a second application separately executed by a PCN or an SCN. The PCN or SCN may be hosted by a server coupled with the client through a network. The method may also include sending request packets via the session connection. The request packets may be destined for processing by the second application separately executed by the PCN or SCN. The method may also include forwarding to the first application received outputted response packets originating from the second application executed by the PCN following completion of a checkpoint action by a COLO manager at the server hosting the PCN or the SCN. For these examples, the checkpoint action may synchronize an operational state of the PCN with an operational state of the SCN.

Example 35

The method of example 34, the PCN hosted by the server coupled with the client through the network and the SCN hosted by a second server coupled with the client through the network.

Example 36

The method of example 35 may also include establishing a second session connection between the first COLO agency and a third COLO agency implemented with a third socket library for use by the second application executed by the SCN hosted by the second server. The method may also include sending the request packets destined for processing by the second application executed by the PCN via the session connection and sending the request packets destined for processing by the second application executed by the SCN via the second session connection. The method may also include receiving outputted response packets originating from the second application executed by the PCN via the session connection and receiving outputted response packets originating from the second application executed by the SCN via the second session connection. The method may also include comparing a first content of the outputted response packets originating from the second application executed by the PCN to a second content of the outputted response packets originating from the second application executed by the SCN to determine that the first and second contents do not match. The method may also include causing the checkpoint action by the COLO manager by sending an indication to the second COLO agency that the first and second contents do not match. The method may also include dropping the outputted response packets originating from the second application executed by the SCN responsive to an indication that the checkpoint action was completed. The method may also include causing the outputted response packets originating from the second application executed by the PCN to be forwarded to the first application.

Example 37

The method of example 34, the PCN may be hosted by the server coupled with the client through the network. The session connection may be established with the second COLO agency implemented within the second socket library for use by the second application executed by the PCN.

Example 38

The method of example 37 may also include sending the request packets destined for processing by the second application separately executed by the PCN and the SCN via the session connection. The method may also include receiving outputted response packets originating from the second application executed by the PCN via the session connection. The method may also include causing the outputted response packets originating from the second application executed by the PCN to be forwarded to the first application.

Example 39

An example at least one machine readable medium may include a plurality of instructions that in response to being executed by system at a server may cause the system to carry out a method according to any one of examples 34 to 38.

Example 40

An example apparatus may include means for performing the methods of any one of examples 34 to 38.

Example 41

An example at least one machine readable medium may include a plurality of instructions that may be executed by a system at a client arranged to host a first application. The instructions, when executed may cause the system to establish a session connection between a first COLO agency implemented within a first socket library for use by the first application and a second COLO agency implemented within a second socket library for use by a second application separately executed by a PCN or an SCN, the PCN or SCN hosted by a server coupled with the client through a network. The instructions may also cause the system to cause request packets to be sent via the session connection. The request packets destined for processing by the second application may be separately executed by the PCN or SCN. The instructions may also cause the system to forward to the first application received outputted response packets originating from the second application executed by the PCN following completion of a checkpoint action by a COLO manager at the server hosting the PCN or the SCN, the checkpoint action to synchronize an operational state of the PCN with an operational state of the SCN.

Example 42

The at least one machine readable medium of example 41, the PCN hosted by the server may be coupled with the client through the network and the SCN hosted by a second server may be coupled with the client through the network.

Example 43

The at least one machine readable medium of example 42, the instructions may further cause the system to establish a second session connection between the first COLO agency and a third COLO agency implemented with a third socket library for use by the second application executed by the SCN hosted by the second server. The instructions may also cause the system to cause the request packets destined for processing by the second application executed by the PCN to be sent via the session connection and cause the request packets destined for processing by the second application executed by the SCN to be sent via the second session connection. The instructions may also cause the system to receive outputted response packets originating from the second application executed by the PCN via the session connection and receiving outputted response packets originating from the second application executed by the SCN via the second session connection. The instructions may also cause the system to compare a first content of the outputted response packets originating from the second application executed by the PCN to a second content of the outputted response packets originating from the second application executed by the SCN to determine that the first and second contents do not match. The instructions may also cause the system to cause the checkpoint action by the COLO manager by sending an indication to the second COLO agency that the first and second contents do not match. The instructions may also cause the system to drop the outputted response packets originating from the second application executed by the SCN responsive to an indication that the checkpoint action was completed. The instructions may also cause the system to cause the outputted response packets originating from the second application executed by the PCN to be forwarded to the first application.

Example 44

The at least one machine readable medium of example 41, the PCN hosted by the server may be coupled with the client through the network. The session connection established with the second COLO agency may be implemented within the second socket library for use by the second application executed by the PCN.

Example 45

The at least one machine readable medium of example 44, the instructions may further cause the system to cause the request packets destined for processing by the second application separately executed by the PCN and the SCN to be sent via the session connection. The instructions may also cause the system to receive outputted response packets originating from the second application executed by the PCN via the session connection. The instructions may also cause the system to cause the outputted response packets originating from the second application executed by the PCN to be forwarded to the first application.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," " "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. At least one non-transitory machine readable medium comprising a plurality of instructions that in response to being executed by a system cause the system to:
   establish, at a server arranged to host a primary container (PCN) or a secondary container (SCN), the PCN and the SCN capable of separately executing a first application, a session connection between a first coarse-grained lock-stepping (COLO) agency implemented within a first socket library for use by the first application and a second COLO agency implemented within a second socket library for use by a second application executed at a client coupled with the server through a network;
   receive request packets originating from the second application at the client; and
   initiate a checkpoint action responsive to receiving an indication that content of outputted response packets originating from the separately executed first application by the PCN and the SCN does not match, the checkpoint action including synchronizing an operational state of the PCN with an operational state of the SCN.

2. The at least one non-transitory machine readable medium of claim 1, the server comprising the host for the PCN.

3. The at least one non-transitory machine readable medium of claim 2, the instructions to further cause the system to:
   receive, at the server, the outputted response packets originating from the first application executed by the SCN that is hosted by a second server, the outputted response packets originating from the first application executed by the SCN received via an internal network communication channel coupling the server to the second server;
   compare content of outputted response packets originating from the first application executed by the SCN to content of outputted response packets originating from the first application executed by the PCN to determine that the content does not match;
   initiate the checkpoint action with a COLO manager at the server, the COLO manager at the server to coordinate the checkpoint action with a COLO manager at the second server;
   send the outputted response packets originating from the first application executed by the PCN to the second COLO agency via the session connection, the outputted response packets originating from the first application executed by the PCN sent following completion of the checkpoint action; and
   drop the outputted response packets originating from the first application executed by the SCN.

4. The at least one non-transitory machine readable medium of claim 2, the instructions to further cause the system to:
   send the outputted response packets originating from the first application executed by the PCN or the SCN to the second COLO agency via the session connection;
   receive the indication that content of outputted response packets originating from the separately executed first application by the PCN and the SCN does not match from the second COLO agency at the client, the second COLO agency capable of receiving outputted response packets originating from the first application executed by both the PCN and the SCN and comparing the outputted response packets originating from the first application executed by the SCN to outputted response packets originating from the first application executed by the PCN to determine that the content does not match; and
   initiate the checkpoint action with a COLO manager at the server, the COLO manager at the server to coordinate the checkpoint action with another COLO manager at a second server arranged to host the SCN.

5. The at least one non-transitory machine readable medium of claim 1, the server comprising the host for the SCN.

6. The at least one non-transitory machine readable medium of claim 5, the instructions to further cause the system to:
   forward outputted response packets originating from the first application executed by the SCN to a first COLO agency implemented within a first socket library for use by the first application executed by the PCN hosted by a second server, the first COLO agency at the second server to send the indication that content of outputted response packets originating from the separately executed first application by the PCN and the SCN does not match; and
   initiate the checkpoint action with a COLO manager at the server, the COLO manager at the server to coordinate the checkpoint action with a COLO manager at the second server.

7. The at least one non-transitory machine readable medium of claim 6, the instructions to further cause the system to:
   receive an indication from the COLO manager at the server that the second server has failed since the sending of the outputted response packets originating from the first application executed by the SCN;
   notify the second COLO agency of the failure; and
   resend the outputted response packets originating from the first application executed by the SCN to the second COLO agency via the session connection.

8. The at least one non-transitory machine readable medium of claim 5, the instructions to further cause the system to:

send the outputted response packets originating from the first application executed by the SCN to the second COLO agency via the session connection;

receive the indication that content of outputted response packets originating from the separately executed first application by the PCN and the SCN does not match from the second COLO agency at the client, the second COLO agency capable of receiving outputted response packets originating from the first application executed by both the PCN and the SCN and comparing the outputted response packets originating from the first application executed by the SCN to outputted response packets originating from the first application executed by the PCN to determine that the content does not match; and initiate the checkpoint action with a COLO manager at the server, the COLO manager at the server to coordinate the checkpoint action with another COLO manager at a second server arranged to host the PCN.

9. An apparatus comprising:

circuitry at a server arranged to host a primary container (PCN) or a secondary container (SCN) capable of separately executing a first application;

a connection component for execution by the circuitry to establish a session connection between a first coarse-grained lock-stepping (COLO) agency implemented within a first socket library for use by the first application and a second COLO agency implemented within a second socket library for use by a second application executed at a client coupled with the server through a network;

a receive component for execution by the circuitry to receive request packets originating from the second application at the client; and an initiate component for execution by the circuitry to initiate a checkpoint action responsive to receiving an indication that content of outputted response packets originating from the separately executed first application by the PCN and the SCN does not match, the checkpoint action including a synchronization of an operational state of the PCN with an operational state of the SCN.

10. The apparatus of claim 9, the server comprising the host for the PCN.

11. The apparatus of claim 10, comprising:

a send component for execution by the circuitry to send the outputted response packets originating from the first application executed by the PCN or the SCN to the second COLO agency via the session connection;

the receive component to receive the indication that content of outputted response packets originating from the separately executed first application by the PCN and the SCN does not match from the second COLO agency at the client, the second COLO agency capable of receiving outputted response packets originating from the first application executed by both the PCN and the SCN and comparing the outputted response packets originating from the first application executed by the SCN and the PCN to determine that the content does not match; and the initiate component to initiate the checkpoint action with a COLO manager at the server, the COLO manager at the server to coordinate the checkpoint action with another COLO manager at a second server arranged to host the SCN.

12. The apparatus of claim 9, the server comprising the host for the SCN.

13. The apparatus of claim 12, comprising:

a send component for execution by the circuitry to forward outputted response packets originating from the first application executed by the SCN to a first COLO agency implemented within a first socket library for use by the first application executed by the PCN hosted by a second server, the first COLO agency at the second server to send the indication that content of outputted response packets originating from the separately executed first application by the PCN and the SCN does not match; and the initiate component to initiate the checkpoint action with a COLO manager at the server, the COLO manager at the server to coordinate the checkpoint action with a COLO manager at the second server.

14. The apparatus of claim 13, comprising:

a failover component for execution by the circuitry to receive an indication from the COLO manager at the server that the second server has failed since the sending of the outputted response packets originating from the first application executed by the SCN;

a notify component for execution by the circuitry to notify the second COLO agency of the failure; and the send component to resend the outputted response packets originating from the first application executed by the SCN to the second COLO agency via the session connection.

15. The apparatus of claim 9, comprising a digital display coupled to the circuitry to present a user interface view.

16. A method comprising:

establishing, at circuitry for a client arranged to host a first application, a session connection between a first coarse-grained lock-stepping (COLO) agency implemented within a first socket library for use by the first application and a second COLO agency implemented within a second socket library for use by a second application separately executed by a primary container (PCN) or a secondary container (SCN), the PCN or SCN hosted by a server coupled with the client through a network;

sending request packets via the session connection, the request packets destined for processing by the second application separately executed by the PCN or SCN; and forwarding, to the first application, received outputted response packets originating from the second application executed by the PCN following completion of a checkpoint action by a COLO manager at the server hosting the PCN or the SCN, the checkpoint action to synchronize an operational state of the PCN with an operational state of the SCN.

17. The method of claim 16, comprising the PCN hosted by the server coupled with the client through the network and the SCN hosted by a second server coupled with the client through the network.

18. The method of claim 17, comprising:

establishing a second session connection between the first COLO agency and a third COLO agency implemented with a third socket library for use by the second application executed by the SCN hosted by the second server;

sending the request packets destined for processing by the second application executed by the PCN via the session connection and sending the request packets destined for processing by the second application executed by the SCN via the second session connection;

receiving outputted response packets originating from the second application executed by the PCN via the session connection and receiving outputted response packets originating from the second application executed by the SCN via the second session connection;

comparing a first content of the outputted response packets originating from the second application executed by the PCN to a second content of the outputted response packets originating from the second application executed by the SCN to determine that the first and second contents do not match;

causing the checkpoint action by the COLO manager by sending an indication to the second COLO agency that the first and second contents do not match;

dropping the outputted response packets originating from the second application executed by the SCN responsive to an indication that the checkpoint action was completed; and causing the outputted response packets originating from the second application executed by the PCN to be forwarded to the first application.

19. The method of claim 16, comprising the PCN hosted by the server coupled with the client through the network, the session connection established with the second COLO agency implemented within the second socket library for use by the second application executed by the PCN.

20. The method of claim 19, comprising:

sending the request packets destined for processing by the second application separately executed by the PCN and the SCN via the session connection; and receiving outputted response packets originating from the second application executed by the PCN via the session connection; and causing the outputted response packets originating from the second application executed by the PCN to be forwarded to the first application.

21. At least one non-transitory machine readable medium comprising a plurality of instructions that in response to being executed by a system cause the system to:

establish, at a client arranged to host a first application, a session connection between a first coarse-grained lock-stepping (COLO) agency implemented within a first socket library for use by the first application and a second COLO agency implemented within a second socket library for use by a second application separately executed by a primary container (PCN) or a secondary container (SCN), the PCN or SCN hosted by a server coupled with the client through a network;

cause request packets to be sent via the session connection, the request packets destined for processing by the second application separately executed by the PCN or SCN; and forward, to the first application, received outputted response packets originating from the second application executed by the PCN following completion of a checkpoint action by a COLO manager at the server hosting the PCN or the SCN, the checkpoint action to synchronize an operational state of the PCN with an operational state of the SCN.

22. The at least one non-transitory machine readable medium of claim 21, comprising the PCN hosted by the server coupled with the client through the network and the SCN hosted by a second server coupled with the client through the network.

23. The at least one non-transitory machine readable medium of claim 22, the instructions to further cause the system to:

establish a second session connection between the first COLO agency and a third COLO agency implemented with a third socket library for use by the second application executed by the SCN hosted by the second server;

cause the request packets destined for processing by the second application executed by the PCN to be sent via the session connection and cause the request packets destined for processing by the second application executed by the SCN to be sent via the second session connection;

receive outputted response packets originating from the second application executed by the PCN via the session connection and receiving outputted response packets originating from the second application executed by the SCN via the second session connection;

compare a first content of the outputted response packets originating from the second application executed by the PCN to a second content of the outputted response packets originating from the second application executed by the SCN to determine that the first and second contents do not match;

cause the checkpoint action by the COLO manager by sending an indication to the second COLO agency that the first and second contents do not match;

drop the outputted response packets originating from the second application executed by the SCN responsive to an indication that the checkpoint action was completed; and cause the outputted response packets originating from the second application executed by the PCN to be forwarded to the first application.

24. The at least one non-transitory machine readable medium of claim 21, comprising the PCN hosted by the server coupled with the client through the network, the session connection established with the second COLO agency implemented within the second socket library for use by the second application executed by the PCN.

25. The at least one non-transitory machine readable medium of claim 24, the instructions to further cause the system to:

cause the request packets destined for processing by the second application separately executed by the PCN and the SCN to be sent via the session connection; and receive outputted response packets originating from the second application executed by the PCN via the session connection; and cause the outputted response packets originating from the second application executed by the PCN to be forwarded to the first application.

* * * * *